(12) United States Patent
Golubchik et al.

(10) Patent No.: US 7,181,623 B2
(45) Date of Patent: Feb. 20, 2007

(54) SCALABLE WIDE-AREA UPLOAD SYSTEM AND METHOD

(75) Inventors: Leana Golubchik, North Bethesda, MD (US); William C. Cheng, North Bethesda, MD (US); Samir Khuller, Burtonsville, MD (US); Samrat Bhattacharjee, Burtonsville, MD (US); Cheng-Fu Chou, Silver Spring, MD (US)

(73) Assignee: University of Maryland, College Park, MD (US)

( * ) Notice: Subject to any disclaimer, the term of this patent is extended or adjusted under 35 U.S.C. 154(b) by 904 days.

(21) Appl. No.: 09/818,940

(22) Filed: Mar. 28, 2001

(65) Prior Publication Data

US 2002/0032865 A1    Mar. 14, 2002

Related U.S. Application Data

(60) Provisional application No. 60/192,525, filed on Mar. 28, 2000.

(51) Int. Cl.
*H04L 9/00* (2006.01)
*H04L 9/32* (2006.01)
*G06F 7/04* (2006.01)
*G06F 15/16* (2006.01)

(52) U.S. Cl. .................. 713/178; 713/153; 726/26

(58) Field of Classification Search ............ 713/200, 713/201, 176, 178, 168, 170, 153, 181; 709/232; 726/26; 705/1
See application file for complete search history.

(56) References Cited

U.S. PATENT DOCUMENTS 6,138,158 A * 10/2000 Boyle et al. ............... 709/225
6,393,566 B1 * 5/2002 Levine ....................... 713/178
6,584,466 B1 * 6/2003 Serbinis et al. ............. 707/10
6,659,861 B1 * 12/2003 Faris et al. .................. 463/1

* cited by examiner

*Primary Examiner*—Emmanuel L. Moise
*Assistant Examiner*—Zachary A. Davis
(74) *Attorney, Agent, or Firm*—Squire, Sanders & Dempsey L.L.P.

(57) ABSTRACT

A server/overlay network architecture and related method prevent (i.e., minimize the likelihood of) overloads from many network clients all trying to upload data files to a common destination server on the network at about the same time. Before a client transfers its (his or her) data file to the common network destination, a unique identifier (generally much smaller than the data itself) for the data of that client is generated. The unique identifier, such as a one-way hash function, is transmitted to an authenticator trusted by the common destination. The authenticator time-stamps (i.e., stores time and date) the unique identifier, digitally signs a message incorporating the unique identifier and the time-stamp and sends the message to the client who sent the unique identifier. The client then sends the data file with its time stamp to one of a plurality of upload proxy servers. The proxy server sends a message to the common destination telling it to pick up the data file when ready. The common destination server thus avoids being overloaded by many clients transferring their rather large data files to it at the same time. The common destination server can check the time-stamp and unique identifier to insure that the data has not been altered after the time-stamp.

26 Claims, 5 Drawing Sheets

SCALABLE WIDE-AREA UPLOAD SYSTEM AND METHOD

CROSS REFERENCE TO RELATED APPLICATIONS

The present application claims the benefit of U.S. Provisional Application No. 60/192,525 filed Mar. 28, 2000. That application is hereby incorporated by reference.

BACKGROUND OF THE INVENTION

The present invention relates to an infrastructure design for handling high-capacity wide-area uploads over the Internet or similar networks. More particularly, the present invention relates to a technique for allowing many clients to send data intended for a common destination server at about the same without overloading the common destination server and its link to the Internet or similar network. Further, a particular client having a slow Internet or other network connection can get credit for data in advance of transferring the complete data to a destination server.

Tremendous increases in network traffic, often called "hot spots," are a major obstacle to achieving scalability in the Internet and other large networks. At the application layer, hot spots are usually caused by either (a) high demand for some data or (b) high demand for a certain service. This high demand for data or services, is typically the result of a real-life event involving availability of new data or approaching deadlines. Therefore, relief of these hot spots improves interaction with the network, remote servers, and, more generally, quality of life. At the application layer, hot spot problems have traditionally been dealt with using some combination of (1) increasing capacity and (2) spreading the load over time, space, or both. Some examples of these are data replication (e.g., web caching, ftp mirroring), data replacement (e.g., multi-resolution images, audio, video), service replication (e.g., DNS lookup, Network Time Protocol), and server push (e.g., news download, software distribution).

The classes of solutions stated above have been studied mostly in the context of applications using the following types of communication (a) one-to-many (data travels primarily from a server to multiple clients, e.g., web download, software distribution, and video-on-demand), (b) many-to-many (data travels between multiple clients, through either a centralized or a distributed server, e.g., chat rooms and video conferencing), and (c) one-to-one (data travels between two clients, e g, e-mail and e-talk).

Hot spots in download applications mostly result from a demand for popular data objects. In contrast, hot spots in upload applications mainly result from a demand for a popular service, e.g., the income tax submission service, as the actual data being transferred by the various users is distinct.

There are two main characteristics which make upload applications different from download applications. First, in the case of uploads, the real-life event (e.g., deadline for filing taxes) which often causes the hot spots imposes a hard deadline on the data transfer service, whereas in the case of downloads, the real-life event (e.g., an important new Supreme Court opinion) translates into a desire for low latency (i.e., immediate or almost immediate) data access. Second, uploads are inherently data writing applications, whereas downloads are data reading applications. Traditional solutions aimed at latency reduction for data reading applications are (a) data replications (using a variety of techniques such as caching, prefetchmg, mirroring, etc) and (b) data replacement (such as sending a low resolution version of the data for image, video, audio downloads). Clearly, these techniques are, not applicable in uploads.

There is an unmet need for solutions to preventing (i.e., minimizing the likelihood of) overloads (server saturation or saturation of links connecting to a server) that result from the hot spots in Internet or similar network transfers involving many-to-one communication. Scalability and efficiency has not generally been achieved in this many-to-one context. Existing solutions, such as web based submissions, simply use many independent one-to-one transfers.

The many-to-one situation corresponds to an important class of applications, whose examples include the various upload applications such as submission of income tax forms, conference paper submission, proposal submission through the National Science Foundation (NSF) FastLane system, homework and project submissions in distance education, voting in digital democracy applications, voting in interactive television, Internet-based storage, among others.

In the current state of upload applications, and with reference to prior art FIG. 1 showing a simplified network structure, a specific upload flow, to a common destination server 10 from a plurality of clients 12 (for ease of illustration only some of the clients are numbered), can experience the following potential bottlenecks (or hot spots):

(1) poor connectivity of the client: some link in the Internet routes 14 between that client and the final destination is the bottleneck of the upload process (including the immediate link that connects the client to the Internet), (2) overload on the server link: the server link (i.e., the part of route 14 closest to the destination server 10) that connects the server 10 to the Internet is overloaded due to too many simultaneous uploads to that server, and this link is the bottleneck of the upload process, (3) overload on the server: the destination server 10 itself is overloaded due to too many simultaneous uploads to that server, and the server is the bottleneck of the upload process.

Given these bottlenecks, there are several traditional solutions (or a combination of these solutions) that one could consider

- get a bigger server, for example, buy a bigger cluster of workstations to act as the upload server, which is intended to address problem (3) above,
- buy a "bigger pipe" (i.e., get a link with greater capacity), that is improve the server's connectivity to the Internet, which is intended to address problem (2) above,
- co-locate the server(s) at the Internet service provider(s) ("ISPs") make arrangements directly with the ISPs to provide upload service at their locations, which is intended to solve problems (1) and (2) above (as well as problem (3) if this service is replicated at multiple ISP's).

These solutions have a number of shortcomings, including lack of flexibility and lack of scalability. For instance, buying a bigger cluster for a "one time event" (which may not be "big enough" for the next similar event) is not the most desirable or flexible solution to the upload problem. Moreover, security concerns may limit one's ability to co-locate servers at multiple ISPs.

OBJECTS AND SUMMARY OF THE INVENTION

Accordingly, it is a primary object of the present invention to provide a new and improved system and method for wide-area upload applications.

A more specific object of the present invention is to provide a scalable infrastructure design for preventing overloads (i.e., minimizing likelihood of hot spots jamming or otherwise hindering network and/or application operations) in wide-area upload applications.

A further object of the present invention is to provide a technique for insuring that submitters submit data by a deadline without overloading a destination location on a network or the network itself.

Yet another object of the present invention is to provide a technique for time-stamping data even before it is transferred to a destination location on a network.

Yet another object of the present invention is to provide a. technique for determining if data has been altered after a unique identifier corresponding to the data is transferred to a destination location on a network, even though, initially only the unique identifier, not the data itself is transferred to the destination location.

A still further object of the present invention is to provide a technique for changing a client push situation (i.e., users sending large amount of data to a common network destination) into at least a partial server pull situation (i.e., common network destination uploads data) when it is ready without causing hot spots.

Yet another object of the present invention is to provide a. technique for wide-area uploads which distributes the burden of uploading over time and to various resources, while maintaining the integrity and privacy of the data and the overall process.

The above and other features of the present invention which will be more readily understood when the following detailed description is considered in conjunction with the accompanying drawings are realized by a method of preventing upload overloads of data from a plurality of clients at different locations within a network to a common destination server in the network. The steps include generating a unique identifier corresponding to and dependent on data that each client intends to send to the common destination server, the unique identifier being smaller in size than the data of the client; separately transmitting the unique identifiers from each client to at least one authenticator trusted by the common destination server; separately time-stamping the unique identifiers as received by the authenticator; separately sending back to each client a message, digitally signed by the authenticator, with the unique identifier sent by that client and the corresponding time-stamp; each client then sending its data towards the common destination server; and the common destination server using the unique identifier for the data provided by each client to confirm that the data provided by each client existed as of the corresponding time-stamp and to insure that the data has been unaltered after the corresponding time-stamp.

Preferably, the generating of the unique identifier is accomplished by using a one-way hash function on the data of each client. The sending of data towards the common destination server by each client is accomplished by sending the data to one of a plurality of upload proxy servers. Each upload proxy server sends a message to the common destination server indicating that it is holding data for it The common destination server uploads the data held for it at any one or more of the upload proxy servers.

Prior to the step of generating the unique identifiers, a sponsor anticipating that a plurality of clients will send large amounts of different data intended for the common destination server in a relatively short time interval, performs the steps of:

establishing the authenticator for the anticipated large amounts of data; and supplying to the authenticator criteria for receiving data from the plurality of clients.

The authenticator creates an event identifier (EID) corresponding to the anticipated plurality of clients sending large amounts of different data intended for the common destination server in a relatively short time interval and the authenticator publishes the EID before the anticipated plurality of clients sending large amounts of different data intended for the common destination server in a relatively short time interval. The criteria for receiving data includes an encryption level to be used when each client is sending data towards the common destination server.

Each upload proxy server sends a message acknowledging receipt of data sent to it by a client.

The authenticator send a message to a client containing a designation of at least one upload proxy server for use by the client.

The present invention may alternately be described as a method of preventing upload overloads of data from a plurality of clients at different locations within a network to a common destination server in the network, the steps including:

generating a unique identifier corresponding to and dependent on data that each client intends to send to the common destination server, the unique identifier being smaller in size than the data of the client;

separately transmitting the unique identifiers from each client to at least one authenticator trusted by the common destination server;

separately sending back to each client a message, digitally signed by the authenticator, with the unique identifier sent by that client;

each client then forwarding its data to the common destination server via proxy upload servers remote from the common destination server; and the common destination server using the unique identifier for the data provided by each client to confirm that the data provided by each client has been unaltered after the generation of the unique identifier.

Preferably, the unique identifiers are one-way hashes of the data that they correspond to. Each upload proxy server send a message to the common destination server indicating that it is holding data for it after that upload proxy server has received data from a client.

The method also includes the step of uploading data from at least one of the upload proxy servers to the common destination server responsive to messages sent indicating that the particular upload proxy server is holding data for the common destination server. The method further includes the step of separately time-stamping the unique identifiers as received by the authenticator; and wherein the step of separately sending back to each client a message, digitally signed by the authenticator, with the unique identifier sent by that client includes the corresponding time-stamp within the message; and wherein the common destination server uses the unique identifier for the data provided by each client to confirm that the data provided by each client existed as of the corresponding time-stamp and to insure that the data.

The present invention may alternately be described as a method of preventing upload overloads of data from a plurality of clients at different locations within a network to a common destination server in the network, the steps include: providing a common destination server in a network, the common destination server set up to receive data from a plurality of clients: providing a plurality of upload proxy servers remote from the common destination server; each client sending data, which is intended for the common destination server, to at least a corresponding one of the upload proxy servers; sending a message, which is smaller in size than the data of a client, to the common destination server to indicate that the common destination server needs to check the corresponding one of the upload proxy servers; and having the common destination server upload the data of a client at some time after the message such that a plurality of clients trying to send data to the common destination server at essentially the same time is less likely to overload the common destination server and its connection to the network.

Prior to the step of the clients sending data, a sponsor anticipating that a plurality of clients will send large amounts of different data intended for the common destination server in a relatively short time interval, performs the steps of: establishing an authenticator for the anticipated large amounts of data; and supplying to the authenticator criteria for receiving data from the plurality of clients. The method further includes the step of having the authenticator create an event identifier (EID) corresponding to the anticipated plurality of clients sending large amounts of different data intended for the common destination server in a relatively short time interval and wherein the authenticator publishes the EID before the anticipated plurality of clients sending large amounts of different data intended for the common destination server in a relatively short time.

The present invention may alternately be described as a system for preventing upload overloads of data from a plurality of clients at different locations within a network to a common destination server in the network, includes: a common destination server in a network, the common destination server set up to receive data from a plurality of clients: an id generator operable to generate a unique identifier corresponding to and dependent on data that each client intends to send to the common destination server, the unique identifier being smaller in size than the data of the client; each client having a sender for separately transmitting the unique identifier from that client; at least one authenticator trusted by the common destination server, the authenticator having a time-stamper for separately time-stamping the unique identifiers as received by the authenticator, the authenticator having a sender for separately sending back to each client a message, digitally signed by the authenticator, with the unique identifier sent by that client and the corresponding time-stamp; and wherein the common destination server includes a checker that uses the unique identifier for the data provided by each client to confirm that the data provided by each client existed as of the corresponding time-stamp and to insure that the data has been unaltered after the corresponding time-stamp.

Each client is operable to send the data towards the common destination server after receiving the message from the authenticator.

The system further includes a plurality of upload proxy servers operable to receive the data provided by each client and wherein the common destination server is operable to upload data held for it by the upload proxy servers. The id generator takes a one-way hash of the data that the client intends to send to the common destination server.

BRIEF DESCRIPTION OF THE DRAWINGS

The above and other features of the present invention will be more readily understood when the following detailed description is considered in conjunction with the accompanying drawings wherein like characters represent like parts throughout the several views and in which.

DETAILED DESCRIPTION

The existence of hot spots in uploads is often due to approaching deadlines such as a deadline for filing taxes, a deadline for submitting bids for a contract, a deadline for submitting articles, etc. The hot spot is exacerbated by the long transfer times for files (often, but not necessarily, relatively large files) of different content that a plurality of clients want to upload at about the same time. The present inventors observe that what is actually required in the deadline situation is an assurance that specific data was submitted before a specific time, and that the transfer of the data needs to be done in a timely fashion, but does not have to occur by that deadline (since the data is not necessarily consumed by a common destination server right away). More generally, even in cases of anticipated upload hot spots, the common destination server may not need the data right away. The system often requires that the data came into existence before a deadline (e.g., the taxpayer filled out a tax return before the deadline). The system also requires that the common destination server can confirm that the tax return data has not been altered after its creation (e.g., after taxpayer created the information at some point before the deadline, taxpayer made no further changes). Some additional examples will be given later to elaborate on these considerations.

Figure 1:
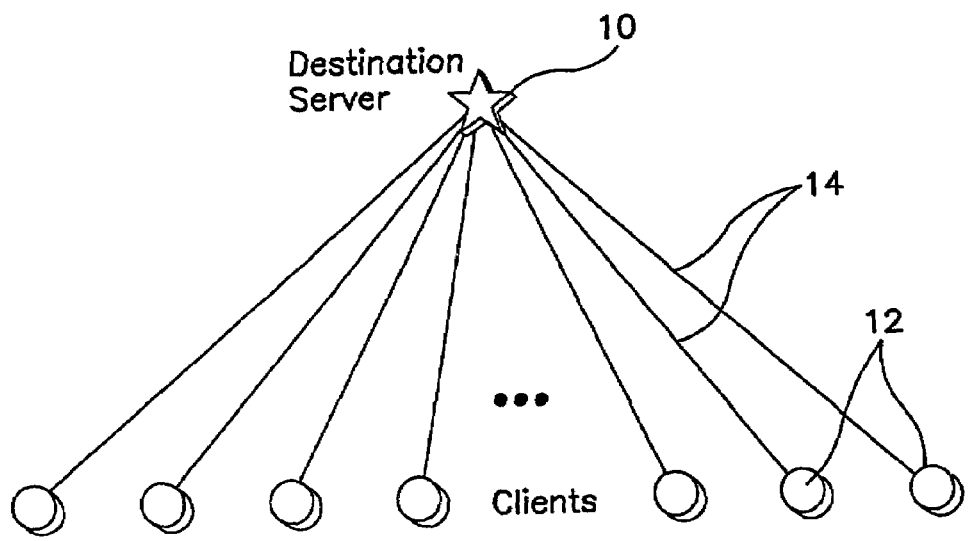
FIG. 1 is the prior art simplified network structure as discussed above.
Figure 2:
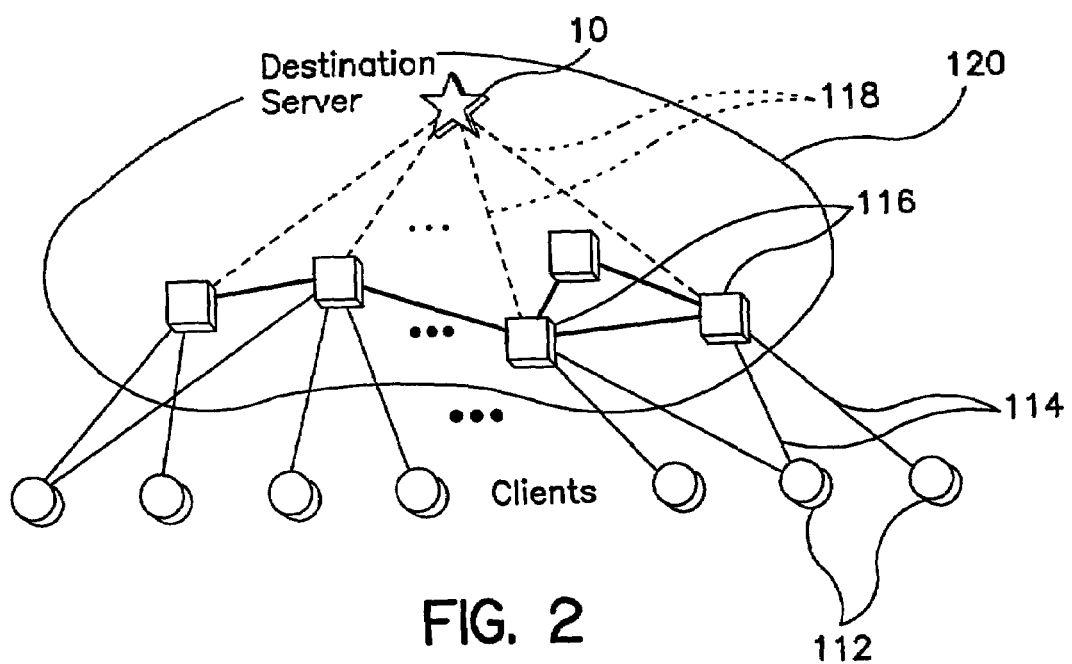
FIG. 2 is a simplified network structure of the present invention.

With reference to FIG. 2, a simplified diagram shows some of the topology of the present invention. This will be used to explain some of the basics of the invention. A plurality of clients 112 in a network are trying to upload various data files to a common destination server 110. However, instead of transmitting the rather large data files from the clients 112 to the destination server 110, the clients 112 send the large data files towards the common destination server 110 via links 114 to various upload proxy servers 116. The common destination server 110 then uploads the files from the upload proxy servers 116 via links 186. The basic concept here is to turn a client push situation (i.e., clients send data to destination server) into a combined client push and server pull situation (i.e., clients send data to upload proxy servers 116, destination server 110 then pulls data from the upload proxy servers 116.) The upload proxy servers 116 together with the destination server 110 and links 118 form a upload proxy system 120.

The basic approach of the invention involves a careful review of the problems of upload hot spots. A deadline-driven upload problem (as well as some other upload potential hot spots) can be divided into (a) a real-time timestamp subproblem, where the technique of the invention ensures that the data is timestamped and that the data cannot be subsequently tampered with, (b) a low latency commit subproblem, where the data goes "somewhere" and the user at the client is ensured that the data is safely and securely "on its way" to the server, and (c) a timely data transfer subproblem, which can be carefully planned (and coordinated with other uploads) and must go to the original destination The present invention takes a traditionally synchronized client-push solution and replaces it with a non-synchronized solution that uses some combination of client-push and server-pull approaches Consequently, the invention prevents (i.e., minimizes the likelihood of) the hot spots by spreading most of the demand on the server over time. This is accomplished by making the actual data transfers "independent" of the deadline or, more generally, spacing the load out timewise on the destination server. All this happens under the destination server's control.

Figure 3:
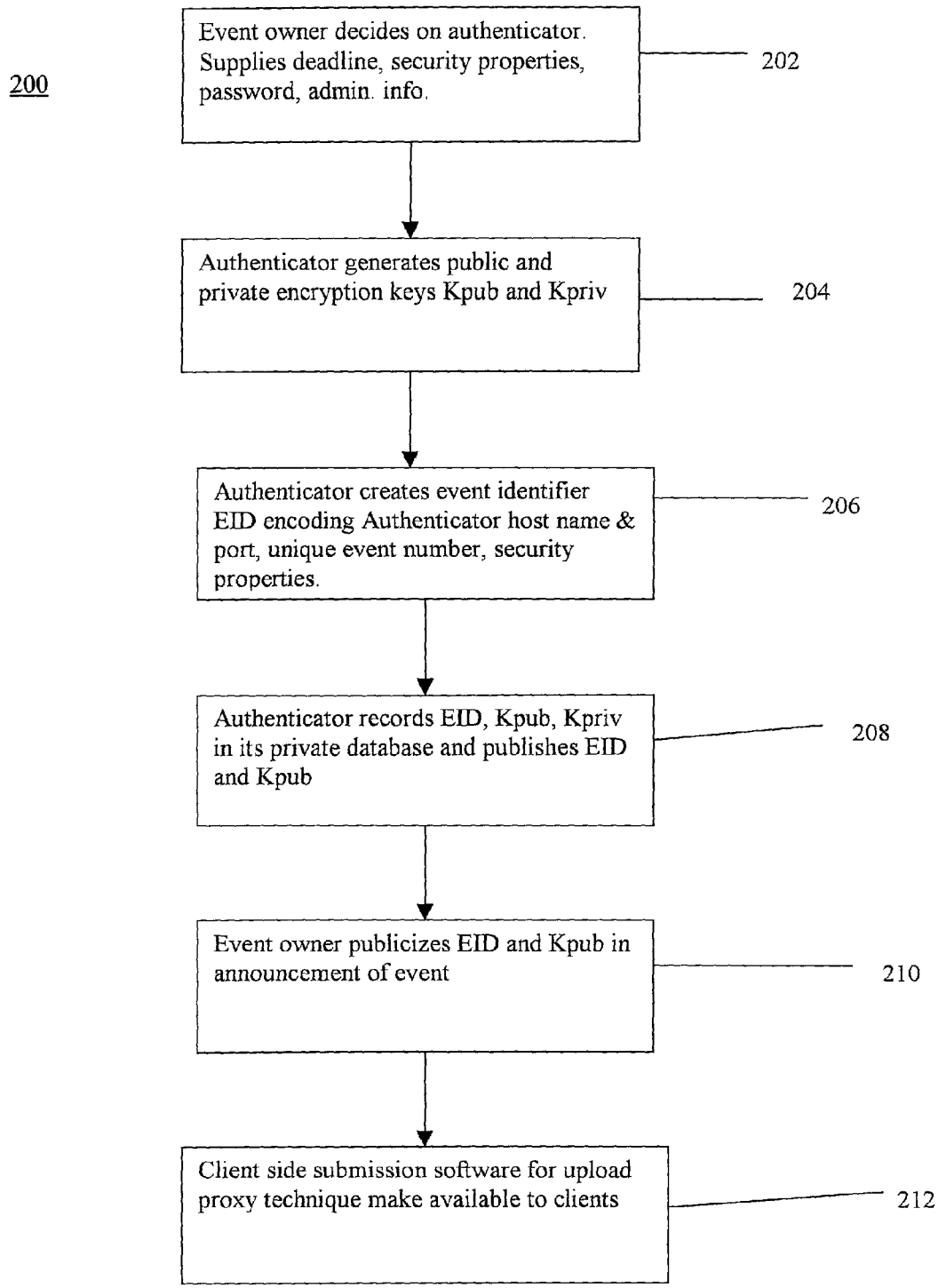
FIG. 3 is a flow chart of an event creation process according to the present invention.
Figure 5:
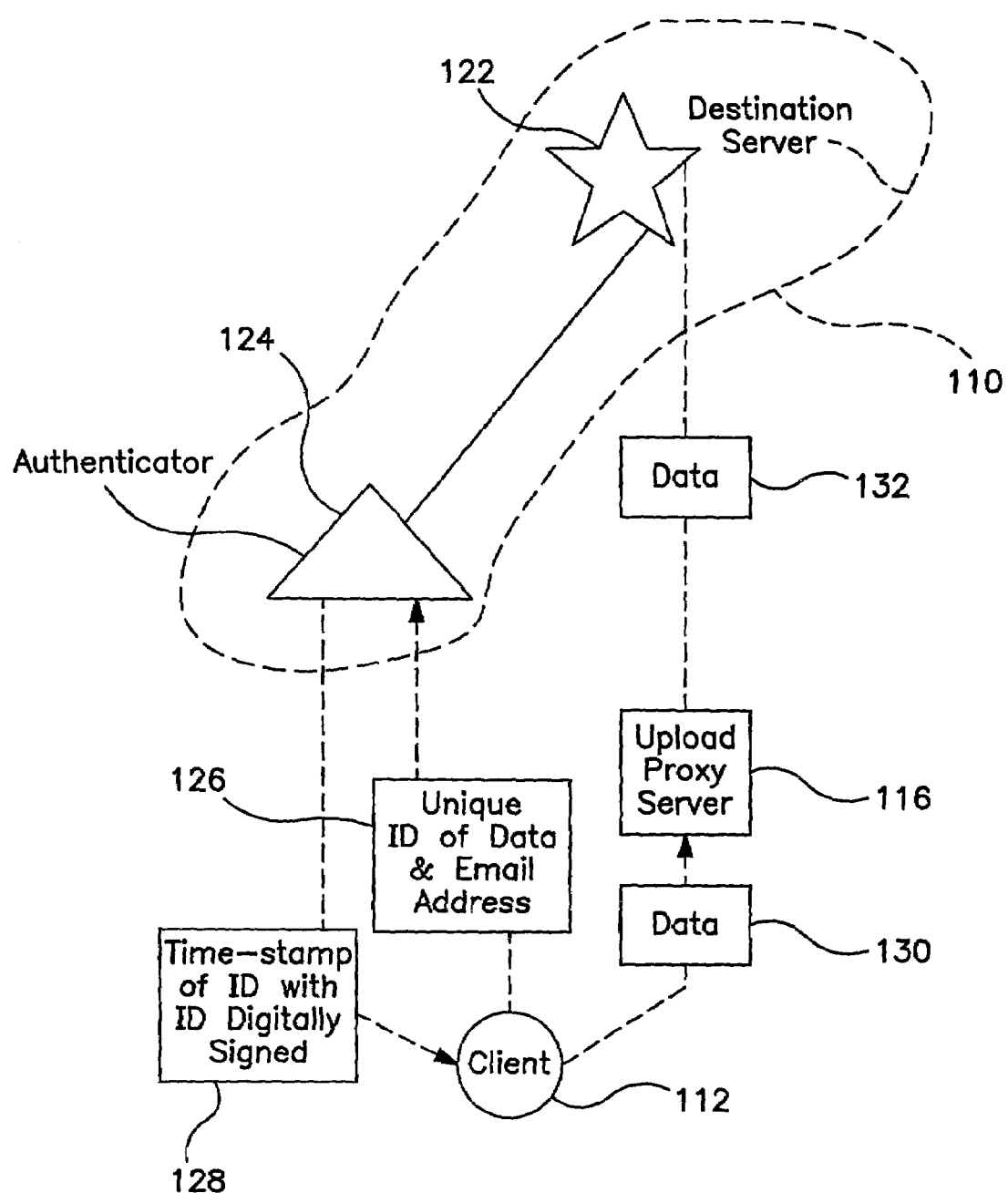
FIG. 5 is a more detailed view of some of the parts of FIG. 2 with some messages between components shown.

With reference now to FIGS. 3 and 5, the process 200 of FIG. 3 allows an owner or operator of destination server 110 (see FIG. 5) to establish an event. That is, the person or entity running server 110 anticipates a possible or likely upload hot spot with numerous clients (such as programs run by users on their own computers) trying to upload large files at about the same time. In preparation for that possibility, in block 202 of FIG. 3, the person or entity running the destination server selects an authenticator 124 (FIG. 5) which the person or entity trusts. In the most simple case as illustrated in FIG. 5, the entity will use its own destination server 110 having usual components in 122, but also having a portion 124 set up with authentication software according to the present invention. More generally, the entity could delegate the setting up of the authenticator 124 to a trusted party.

The event that is being established might be an event with a specific time deadline such as a tax form due by a set date. It could also be a situation where numerous persons try to get data to the destination server and the order of receipt is important. For example, the event owner might run a contest where the first ten persons supplying correct answers to a hundred questions win prizes. Although there is no fixed deadline, time of supplying the information is still important in that case. The event might simply be a seasonal event such as a costume company anticipating a Halloween rush of orders that would overload its server capacity and/or the capacity of its link to the Internet.

Although authenticator 124 is shown differently from upload proxy server 116 (owned or operated by an entity different than that controlling server 110) in FIG. 5, each upload proxy server 116 could also include an authenticator portion trusted by its owner. In other words, authenticators could be the same as the upload proxy servers, but just performing different functions depending on the situation.

As shown in block 202 of FIG. 3, the event owner supplies a deadline (if applicable), security properties to be used for the process (such as which public/private key system to use and key lengths, a password for future administrative access to the authenticator for the event, and administrative information about the event owner, such as e-mail address. This would be sent to the authenticator 124 in a secure way such as through HTTPS, Diffe-Hellman, etc.).

At block 204, the authenticator generates public and private encryption keys Kpub and Kpriv for the event. This leads to block 206 where the authenticator creates an event identifier EID encoding the authenticator host name and port, a unique event number, and security properties. The EID, Kpub, and Kpriv are recorded in a private database of the authenticator 124 at block 208. The EID and Kpub are published, such as distributed to potential clients via an announcement at block 210. At block 212, the event owner may also make available for download client-side submission software to perform the upload proxy technique of the invention.

Figure 4:
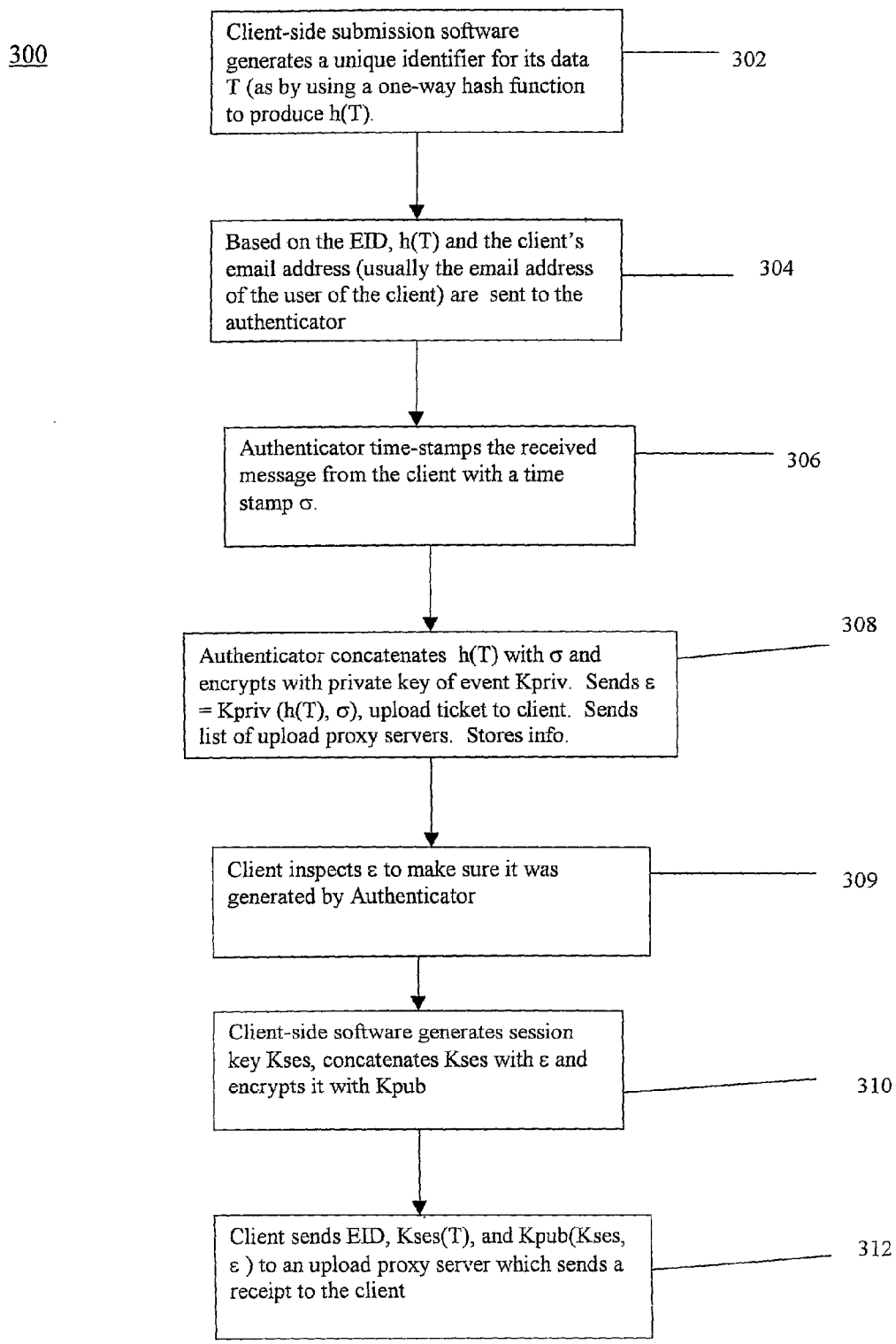
FIG. 4 is a flow chart of a client submission process according to the present invention;.

Turning now to FIGS. 4 and 5, the process 300 of client submission will be discussed. At block 302, a unique identifier for the data file T that the client intends to send to the destination server 110 is generated such as using a one-way hash function h to produce h(T). At block 304, based on the EID, h(T) and the client's email address are sent to the authenticator 124, this being illustrated by the message 126 in FIG. 5.

At block 306 of FIG. 4, the authenticator time-stamps the received message from the client with a time stamp σ. At block 308, the authenticator concatenates h(T) with σ and encrypts the result with the private key of event Kpriv. As also shown by message 128, the result ∈=Kpriv (h(T), σ), an upload ticket, is sent to the client 112. It may also optionally send a list of upload proxy servers that the client may use. It should be understood that encrypting the data with the event private key is the same as digitally signing the data.

At block 309 of FIG. 4, the client 112 inspects s to make sure it was generated by the authenticator and not some imposter.

At block 310 of FIG. 4, the client 112 generates a session key Kses (length set in the EID) and encrypts T with Kses according to a known symmetric-key cryptographic standard (such as DES or triple DES) specified in EID. Client 112 then concatenates Kses with ∈, encrypts Kses with the public key Kpub of the event, and, at block 312, sends EID, Kses(T), and Kpub(Kses, ∈) to one of the upload proxy servers 116 (only one shown in FIG. 5). (The selection of a particular upload proxy server will be discussed below.) Message 130 of FIG. 5 is the data being sent to upload proxy server 116, but it will be understood that the data is encrypted in the stated manner except that the EID is sent in the clear (i.e., unencrypted form). Therefore, the owner of the destination server 110 does not need to trust the owner of the particular upload proxy server 116 through which the data is sent. Any alteration in the data can be detected.

As also indicated in block 312, the upload proxy server sends a receipt (not shown in FIG. 5) to the client. The receipt is preferably digitally signed by a private key used by the particular upload proxy server. The receipt may be the upload proxy server's digital signature of the EID, Kses(T), and Kpub(Kses, ∈). This helps guard against so-called man-in-the-middle attacks.

Figure 6:
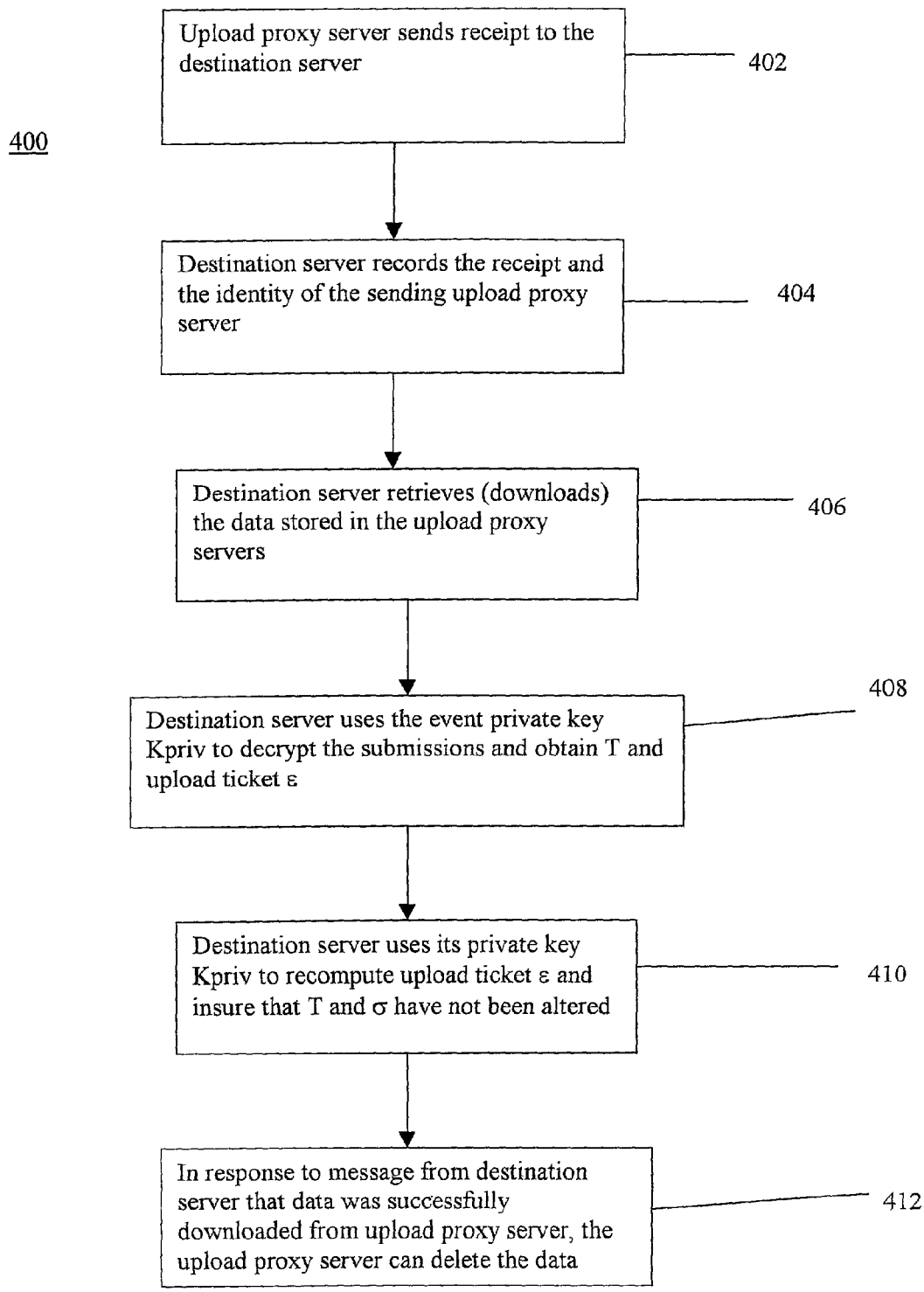
FIG. 6 is a flow chart of the process of interaction of an upload proxy with a destination server according to the present invention;.

The data corresponding to T is now in the proxy server 116. Turning now to FIG. 6 and continuing to consider FIG. 5, the process 400 of interaction of the destination server 110 and the upload proxy server 116 will be discussed. FIG. 5 shows the general idea that data 132 (same as data 130) is eventually sent to the destination server 110. (Although shown as going to part 122 of server 110, it could alternately go to authenticator portion 124 of server 110.) FIG. 6 shows the details of the process.

At block 402 of FIG. 6, the upload proxy server 116 sends the receipt to the destination server 110. (This receipt is sent at about the same time as the receipt sent to the client as discussed above in connection with block 312.) The receipt advises server 110 that server 116 has a submission for EID. At block 404, the server 110 records the receipt and the identity of the upload proxy server holding the information for it. After the deadline of the event (if applicable) or otherwise at a later time, and at block 406, the destination server 110 uploads the data from each of the upload proxy servers 116. This corresponds to message 132 of FIG. 5.

At block 408, the destination server 110 uses the event private key Kpriv to decrypt the submissions and obtain T and the upload ticket ε (from which the time stamp σ is obtained). Server 110 determines the session key Kses and uses that to obtain T. At block 410, the destination server 110 uses its private key Kpriv to recompute upload ticket ε and verify that the upload ticket is genuine and the data and time stamp σ have not been altered. (If the data does not match, the destination server 110 may send an email to the upload proxy server asking that it be resent and/or may send an email to the client telling the client to directly send the data.) At block 412, the upload proxy server can delete information successfully uploaded by the destination server 110. Before that deletion occurs, the destination server 110 preferably sends an acknowledgement to the upload proxy server indicating successful receipt of valid data. The destination server may also send an email to the client telling the client that its complete data was successfully received.

Although the upload proxy servers 116 are an important feature of the present invention, aspects of the present invention could still be used without regard to the proxy servers. Returning to the example of an event owner running a contest where the first ten persons supplying correct answers to a hundred questions win prizes, the owner could use the authenticator 124 to time stamp and sign a unique identifier based on the answers of the contestants, even without the contestants uploading their answers to the server 110. In such a modified arrangement without using proxy servers, the contestants can get their answers time stamped by sending the relatively small unique identifier such as a hash. The larger files of the answers themselves can be sent to the server 110 (i.e., without proxy servers 116) at a later time, thus avoiding a hot spot caused by uploads of numerous large files (i.e., that are relatively large compared to hash function h(T)) in a short time interval. However, the proxy servers are necessary to realize the full advantages of the preferred technique of the invention.

One should also be aware that the present invention contemplates that a client 112 (FIGS. 2 and 5) may also function as its own upload proxy server 116 provided that the client has obtained the proxy server software and is not behind a firewall that would prevent it from functioning as an upload proxy server. The client could also include the functions of authenticator 124 when the client will be a destination server for others.

It is often difficult to deploy a server infrastructure over the public Internet. However, the inventors have done a simulation study that indicates that even a limited number of public upload proxy servers can provide benefits for users of the system.

Some examples may help explain why users can benefit from running upload proxy servers.

The IRS expects a huge number of tax forms to be submitted electronically before the deadline of April 15. It can set up capacity to directly receive all of the returns in the surge of uploads in the last few days, but that capacity is wasted most of the year. Suppose instead that the IRS sets up a proxy upload server 116 (which also performs as authenticator 124 for the IRS). During its busy season before April 15, the IRS server performs the functions of authenticator 124 of FIG. 5. Instead of having the capacity to receive a huge number of the relatively large tax files in a short time interval, the IRS simply has the capacity to receive the unique identifiers (e.g., such as hashes of the final form of the data corresponding to a tax return) before the deadline. After the deadline, the IRS can receive the large files, via the upload proxy servers of others, through the described process. When the load on the IRS computers is reduced from its peak, the IRS can maintain a public upload proxy server for use by others.

In similar fashion, the General Services Administration (GSA) expects a huge spike in contract proposal submissions at another time of year. It can establish a public upload proxy server and use the described process to avoid hot spots in uploads. During the busy time at GSA, it can use the upload proxy servers of IRS. In return, it allows IRS to use its upload proxy servers during the busy season for the IRS.

The same type of reciprocity comes into play in the private sector. A swimming pool accessory supplier has a web site on the Internet and a busy season for receiving orders of May to September, whereas a snowmobile parts supplier with an Internet web site has a busy season from November to March. Each business can establish its own upload proxy server which performs the functions of upload proxy server 116 for others and performs the functions of authenticator 124 for itself. This may avoid each business losing customers if an order cannot be directly submitted during the peak load for that business.

In somewhat similar fashion to a business or ISP running a news server for USENET on the Internet, which communicates news to other news servers, each upload proxy server may communicate its existence to others so that each has a database of upload proxy servers and indicating availability. The authenticators such as 124 can collect data relative to the reliability, capacity, and trustworthiness of the various upload proxy servers 116.

There are many ways in which an upload proxy server can be selected for a particular client. The destination server or its authenticator can designate a default upload proxy server or otherwise direct the client to one or several (from which client can select) upload proxy servers. The authenticator could include a list of several upload proxy servers along with the upload ticket sent to a client. In the case of the swimming pool accessory supplier, the customer can be asked which state he or she is in. The destination server of the pool accessory supplier can simply select a known upload proxy server from that state or otherwise nearby and communicate the selection when sending the message 128 of FIG. 5. Alternately, the client can have software that searches for upload proxy servers most directly linked to the client.

The destination server 110 can collect data from the upload proxy servers 116 one at a time or from several at once, depending on server 110 and the capacity of its link(s) to the Internet. Many different techniques could be used for determining the order in which the destination server uploads data from the upload proxy servers.

Although specific constructions have been presented, it is to be understood that these are for illustrative purposes only. Various modifications and adaptations will be apparent to those of skill in the art. Therefore, the scope of the present invention should be determined by reference to the claims.

What is claimed is:

1. A method of preventing upload overloads of data from a plurality of clients at different locations within a network to a common destination server in the network, the steps comprising:

generating a unique identifier corresponding to and dependent on data that each client intends to send to the common destination server, the unique identifier being smaller in size than the data of the client;

separately transmitting the unique identifiers from each client to at least one authenticator trusted by the common destination server, wherein the at least one authenticator is a component of the destination server;
separately time-stamping the unique identifiers as received by the at least one authenticator;
separately sending back to each client a message, digitally signed by the at least one authenticator, with the unique identifier sent by that client and the corresponding time-stamp;
each client then sending its data towards the common destination server; and
the common destination server using the unique identifier for the data provided by each client to confirm that the data provided by each client existed as of the corresponding time-stamp and to insure that the data has been unaltered after the corresponding time-stamp.

2. The method of claim 1 wherein the generating of the unique identifier is accomplished by using a one-way hash function on the data of each client.

3. The method of claim 1 wherein the sending of data towards the common destination server by each client is accomplished by sending the data to one of a plurality of upload proxy servers.

4. The method of claim 3, further comprising the step of: sending a message from each upload proxy server to the common destination server indicating that each upload proxy server is holding data for the common destination server.

5. The method of claim 4, further comprising the step of uploading, by the common destination server, the data held for the common destination server at any one or more of the upload proxy servers.

6. The method of claim 5, wherein prior to the step of generating the unique identifiers, a sponsor anticipating that a plurality of clients will send large amounts of different data intended for the common destination server in a relatively short time interval, performs the steps of:
establishing the at least one authenticator for the anticipated large amounts of data; and
supplying to the at least one authenticator criteria for receiving data from the plurality of clients.

7. The method of claim 6, further comprising the step of creating, by the at least one authenticator, an event identifier (EID) corresponding to the anticipated plurality of clients sending large amounts of different data intended for the common destination server in a relatively short time interval and wherein the at least one authenticator publishes the EID before the anticipated plurality of clients have sent large amounts of different data intended for the common destination server in a relatively short time interval.

8. The method of claim 3, further comprising the step of: sending a message from each upload proxy server acknowledging receipt of data sent to each upload proxy server by a client.

9. The method of claim 3 further comprising the step of the at least one authenticator sending a message to a client containing a designation of at least one upload proxy server for use by the client.

10. The method of claim 1, wherein prior to the step of generating the unique identifiers, a sponsor anticipating that a plurality of clients will send large amounts of different data intended for the common destination server in a relatively short time interval, performs the steps of:
establishing the at least one authenticator for the anticipated large amounts of data; and
supplying to the at least one authenticator criteria for receiving data from the plurality of clients.

11. The method of claim 10, further comprising the step of creating, by the at least one authenticator, an event identifier (EID) corresponding to the anticipated plurality of clients sending large amounts of different data intended for the common destination server in a relatively short time interval and wherein the at least one authenticator publishes the EID before the anticipated plurality of clients have sent large amounts of different data intended for the common destination server in a relatively short time.

12. The method of claim 10 wherein the criteria for receiving data includes an encryption level to be used when each client is sending data towards the common destination server.

13. A method of preventing upload overloads of data from a plurality of clients at different locations within a network to a common destination server in the network, the steps comprising:
generating a unique identifier corresponding to and dependent on data that each client intends to send to the common destination server, the unique identifier being smaller in size than the data of the client;
separately transmitting the unique identifiers from each client to at least one authenticator trusted by the common destination server, wherein the at least one authenticator is a component of the destination server;
separately sending back to each client a message, digitally signed by the at least one authenticator, with the unique identifier sent by that client;
each client then forwarding its data to the common destination server via proxy upload servers remote from the common destination server; and
the common destination server using the unique identifier for the data provided by each client to confirm that the data provided by each client has been unaltered after the generation of the unique identifier.

14. The method of claim 13 wherein the unique identifiers are one-way hashes of the data that the unique identifiers correspond to.

15. The method of claim 13 further comprising the step of sending a message from each upload proxy server to the common destination server indicating that each upload proxy server is holding data for the common destination server after that upload proxy server has received data from a client.

16. The method of claim 15 further comprising the step of uploading data responsive to messages sent indicating that the particular upload proxy server is holding data for the common destination server.

17. The method of claim 16 further comprising the step of separately time-stamping the unique identifiers as received by the at least one authenticator; and wherein the step of separately sending back to each client a message, digitally signed by the at least one authenticator, with the unique identifier sent by that client includes the corresponding time-stamp within the message; and wherein
the common destination server uses the unique identifier for the data provided by each client to confirm that the data provided by each client existed as of the corresponding time-stamp and to insure that the data has been unaltered after the corresponding time-stamp.

18. The method of claim 16 wherein, prior to the step of generating the unique identifiers, a sponsor anticipating that a plurality of clients will send large amounts of different data intended for the common destination server in a relatively short time interval, performs the steps of:
establishing the at least one authenticator for the anticipated large amounts of data; and supplying to the at least one authenticator criteria for receiving data from the plurality of clients.

19. The method of claim 18 further comprising the step of creating, by the at least one authenticator, an event identifier (EID) corresponding to the anticipated plurality of clients sending large amounts of different data intended for the common destination server in a relatively short time interval and wherein the at least one authenticator publishes the EID before the anticipated plurality of clients have sent large amounts of different data intended for the common destination server in a relatively short time.

20. The method of claim 19 wherein the criteria for receiving data includes an encryption level to be used when each client is sending data towards the common destination server.

21. The method of claim 13 further comprising the step of separately time-stamping the unique identifiers as received by the at least one authenticator; and wherein the step of separately sending back to each client a message, digitally signed by the at least one authenticator, with the unique identifier sent by that client includes the corresponding time-stamp within the message; and wherein the common destination server uses the unique identifier for the data provided by each client to confirm that the data provided by each client existed as of the corresponding time-stamp and to insure that the data has been unaltered after the corresponding time-stamp.

22. The method of claim 13 wherein, prior to the step of generating the unique identifiers, a sponsor anticipating that a plurality of clients will send large amounts of different data intended for the common destination server in a relatively short time interval, performs the steps of:

establishing the at least one authenticator for the anticipated large amounts of data; and supplying to the at least one authenticator criteria for receiving data from the plurality of clients.

23. A system for preventing upload overloads of data from a plurality of clients at different locations within a network to a common destination server in the network, comprising:

a common destination server in a network, the common destination server set up to receive data from a plurality of clients:

an ID generator operable to generate a unique identifier corresponding to and dependent on data that each client intends to send to the common destination server, the unique identifier being smaller in size than the data of the client;

each client having a sender for separately transmitting the unique identifier from that client;

at least one authenticator trusted by the common destination server, the at least one authenticator having a time-stamper for separately time-stamping the unique identifiers as received by the at least one authenticator, the at least one authenticator having a sender for separately sending back to each client a message, digitally signed by the at least one authenticator, with the unique identifier sent by that client and the corresponding time-stamp, wherein the at least one authenticator is a component of the destination server; and wherein the common destination server includes a checker that uses the unique identifier for the data provided by each client to confirm that the data provided by each client existed as of the corresponding time-stamp and to insure that the data has been unaltered after the corresponding time-stamp.

24. The system of claim 23 wherein each client is operable to send the data towards the common destination server after receiving the message from the at least one authenticator.

25. The system of claim 24 further comprising a plurality of upload proxy servers operable to receive the data provided by each client and wherein the common destination server is operable to upload data held for the common destination server by the upload proxy servers.

26. The system of claim 25 wherein the ID generator takes a one-way hash of the data that the client intends to send to the common destination server.

* * * * *